United States Patent
Ding et al.

(10) Patent No.: US 11,967,828 B2
(45) Date of Patent: Apr. 23, 2024

(54) METHOD AND DEVICE FOR LOW-CARBON INTEGRATED ENERGY SYSTEM SCHEDULING

(71) Applicant: Xi'an Jiaotong University, Xi'an (CN)

(72) Inventors: Tao Ding, Xi'an (CN); Wenhao Jia, Xi'an (CN); Miao Yang, Xi'an (CN); Chenggang Mu, Xi'an (CN); Ouzhu Han, Xi'an (CN); Yuge Sun, Xi'an (CN); Hongji Zhang, Xi'an (CN); Yuhan Huang, Xi'an (CN); Yuankang He, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 18/448,627

(22) Filed: Aug. 11, 2023

(65) Prior Publication Data
US 2024/0055869 A1    Feb. 15, 2024

(30) Foreign Application Priority Data
Aug. 12, 2022  (CN) .......................... 202210964574.5

(51) Int. Cl.
*H02J 3/46* (2006.01)

(52) U.S. Cl.
CPC ........... *H02J 3/466* (2020.01); *H02J 2203/10* (2020.01)

(58) Field of Classification Search
CPC .............................. H02J 3/466; H02J 2203/10
See application file for complete search history.

(56) References Cited

U.S. PATENT DOCUMENTS

| | | | | |
|---|---|---|---|---|
| 2010/0235206 A1* | 9/2010 | Miller | .................... | E04D 3/352 703/1 |
| 2015/0339762 A1* | 11/2015 | Deal | .................. | G06Q 30/0283 705/27.1 |

(Continued)

FOREIGN PATENT DOCUMENTS

| CN | 110750758 A | 2/2020 |
|---|---|---|
| CN | 111064229 A | 4/2020 |
| CN | 114498641 A | 5/2022 |

OTHER PUBLICATIONS

Yaxuan Han et al., "Analysis of Economic Operation Model for Virtual Power Plants Considering the Uncertainties of Renewable Energy Power Generation," IEEE Sustainable Power & Energy Conference, Dec. 22, 2021, pp. 1,980-1,985.

(Continued)

*Primary Examiner* — Ziaul Karim
(74) *Attorney, Agent, or Firm* — Piloff Passino & Cosenza LLP; Sean A. Passino; Rachel K. Piloff

(57) ABSTRACT

Provided is a method and device for low-carbon integrated energy system scheduling. A specific embodiment of this method comprise: obtaining the energy device information set for each energy device in the virtual power plant; generating the acquisition cost information for each energy device based on an energy device name, energy device parameter information and an energy device number in the energy device information set; generating the energy scheduling objective values and the parameter information of each energy device based on the preset constraint sets and energy acquisition cost information of each energy device; controlling each energy device in the virtual power plant to execute the energy scheduling tasks based on the objective energy device parameter information.

4 Claims, 2 Drawing Sheets

(56) References Cited

U.S. PATENT DOCUMENTS

2016/0350778 A1* 12/2016 Levine .................. G06Q 40/04
2018/0284758 A1* 10/2018 Cella ...................... G06N 3/088
2019/0324444 A1* 10/2019 Cella ................. G05B 19/4183

OTHER PUBLICATIONS

Zhinan Wang et al., "Robust Optimal Scheduling Model of Virtual Power Plant Combined Heat and Power Considering Multiple Flexible Loads," Electric Power Construction, Jul. 2021, vol. 42, No. 7.
First Search Report for China Application No. 202210964574.5.
Notice to Grant for China Application No. 202210964574.5, dated Sep. 30, 2022.

* cited by examiner

Obtaining an energy device information set corresponding to each of the energy devices in a virtual power plant — 101

Generating energy acquisition cost information corresponding to each piece of the energy device information for each piece of the energy device information comprised in the energy device information set according to the energy device name, the energy device parameter information and the energy device number comprised in each piece of the energy device information — 102

Generating energy scheduling objective values and objective energy device parameter information based on preset constraint sets and the generated energy acquisition cost information — 103

Controlling each of the energy devices in the virtual power plant to execute energy scheduling tasks according to each piece of the objective energy device parameter information — 104

FIG. 1

METHOD AND DEVICE FOR LOW-CARBON INTEGRATED ENERGY SYSTEM SCHEDULING

CROSS-REFERENCE TO RELATED APPLICATIONS

This application claims priority to Chinese Patent Application No. 202210964574.5, filed on Aug. 12, 2022, the contents of which are hereby incorporated by reference.

TECHNICAL FIELD

The present application relates to the technical field of energy systems, specifically to a method and device for low-carbon integrated energy system scheduling.

BACKGROUND

In the context of global low-carbon development, the virtual power plant may coordinate various types of energy, such as electricity, gas, heat, and hydrogen, thus providing an effective solution to enhance energy efficiency and reduce carbon emissions. However, the randomness and uncertainty of renewable energy output pose great challenges to the low-carbon virtual power plant scheduling. At present, the traditional methods utilize stochastic optimization to achieve low-carbon virtual power plant scheduling. However, the above methods often have the following technical challenges:

- First, traditional methods have not considered comprehensive parameter information for virtual power plant scheduling. Hence, the scheduling plans determined by the traditional stochastic optimization methods have poor applicability, which further leads to high energy consumption and carbon emissions during the operation of virtual power plants.
- Second, the traditional stochastic optimization methods rely on predetermined probability distributions of renewable energy output, which are actually difficult to accurately obtain. Hence, the scheduling plans determined by the traditional stochastic optimization methods have poor applicability, which further leads to high energy consumption and carbon emissions during the operation of virtual power plants.

The above information disclosed in the background technology section is only used to enhance the understanding of the background of the present application, and therefore, it may include information that does not constitute prior art known to ordinary technical personnel in this field in the country.

SUMMARY

The content of the present application is intended to briefly introduce the concepts, which will be described in detail in the specific embodiments section later. The content of the present application is not intended to identify key or necessary features of the technical solution required for protection, nor is it intended to limit the scope of the technical solution required for protection.

The embodiments of the present application propose a method and device for low-carbon virtual power plant scheduling to solve one or more of the technical problems mentioned in the background technical section above.

First, the embodiments of the present application provide a method for low-carbon virtual power plant scheduling, comprising: obtaining the energy device information set for each energy device in the virtual power plant, where each piece of the energy device information in the above energy device information set comprises an energy device name, energy device parameter information and an energy device number; generating the energy acquisition cost information for each energy device based on the energy device name, energy device parameter information and the energy device number in the energy device information set; generating the energy scheduling objective values and the objective energy device parameter information of each energy device based on the preset constraint sets and energy acquisition cost information of each energy device; controlling each energy device in the virtual power plant to execute the energy scheduling tasks based on the objective energy device parameter information.

Second, the embodiments of the present application provide a device for low-carbon virtual power plant scheduling, comprising: acquisition unit, configured to obtain the energy device information set for each energy device in the virtual power plant, wherein the energy device information in the above energy device information set comprises the energy device names, energy device parameter information and energy device number; first generation unit, configured to generate the energy acquisition cost information for each energy device based on the energy device names, energy device parameter information and energy device number in the energy device information set; second generation unit, configured to generate the energy scheduling objective values and the objective energy device parameter information of each energy device based on the preset constraint sets and energy acquisition cost information of each energy device; control unit, configured to control each energy device in the virtual power plant to execute the energy scheduling tasks based on the objective energy device parameter information.

The above embodiments of the present application have the following beneficial effects: first, by using the low-carbon virtual power plant scheduling method in this application, the comprehensiveness of energy scheduling parameters may be improved. For example, the detailed model and parameter information of carbon capture and storage (CCS) are considered. Hence, the scheduling plans generated by the embodiments of the present application may have wider applicability, thus further improving comprehensive energy efficiency and reducing carbon emissions. Second, the low-carbon virtual power plant scheduling method in this application does not require predetermined probability distributions of renewable energy output. Hence, the flexibility and applicability of the virtual power plant scheduling may be improved.

BRIEF DESCRIPTION OF THE DRAWINGS

FIG. 1 is a flowchart of some embodiments of the low-carbon virtual power plant scheduling method in the present application;

DETAILED DESCRIPTION OF THE EMBODIMENTS

Figure 2:
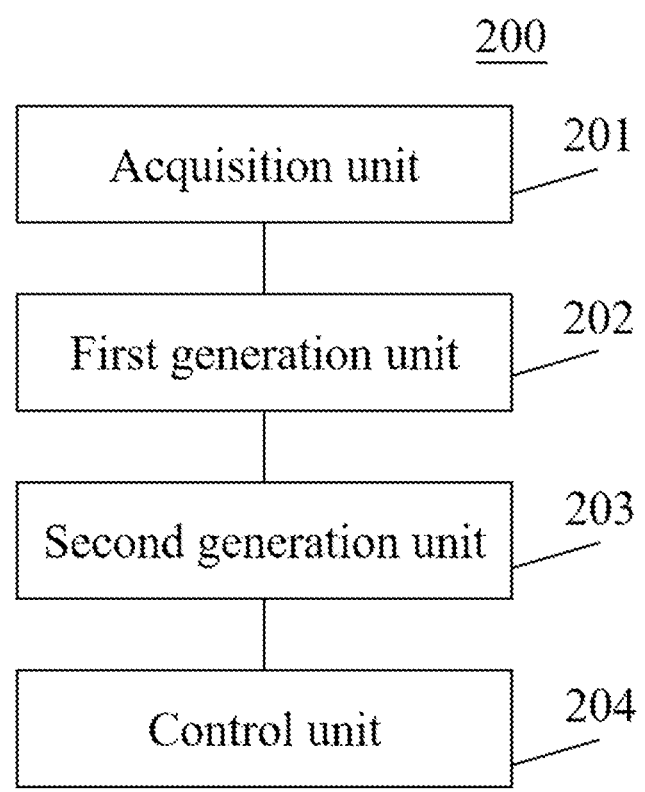
FIG. 2 is a structural schematic diagram of some embodiments of the low-carbon virtual power plant scheduling device in the present application.

The present application will be further described in detail below with reference to the drawings and embodiments. Although certain embodiments of the present application are shown in the drawings, it should be noted that the present application may be implemented in various forms and should not be limited to the embodiments described here. On the contrary, these embodiments are provided for a more thorough and complete understanding of the present application. It should be noted that the drawings and embodiments disclosed in this application are only for illustrative purposes and are not intended to limit the scope of protection of this application.

Furthermore, it should be noted that for the convenience of description, only the parts related to the present application are shown in the drawings. The embodiments of the present application and the features in the embodiments may be combined with each other without conflict.

It should be noted that the concepts such as "first" and "second" mentioned in the present application are only used to distinguish different devices, modules, or units, and are not intended to limit the order or interdependence of the functions performed by these devices, modules or units.

It should be noted that the "one" and "multiple" mentioned in the present application are indicative rather than restrictive. It should be understood by the technicians of this field that they should be understood as "one or more", unless otherwise explicitly stated in the context.

The names of the messages or information exchanged between the devices in the embodiments are only for illustrative purposes but are not intended to limit the scope of these messages or information.

The present application will be described in detail below with reference to the drawings and embodiments.

FIG. 1 illustrates the process 100 of some embodiments of the low-carbon virtual power plant (IES) scheduling method based on the present application. The low-carbon IES scheduling method includes the following steps:

S101: obtaining the energy device information set for each energy device in the IES.

In some embodiments, the IES operator may obtain the energy device information set for each energy device in the IES through a wired connection or wireless connection. The energy device information in the above energy device information set comprises energy device names, energy device parameter information and energy device numbers. The energy devices correspond one-to-one to the energy device information in the energy device information set. The above energy devices may include photovoltaic systems (PV), combined heat and power units (CHP), carbon capture and storage devices (CCS), power-to-gas devices (P2G), and energy storage devices (ES). There is no limit on the number of PVs, CHPs, CCSs, P2Gs, or ESs mentioned above. The energy device name of PVs may be "photovoltaic system". The energy device parameters of the PV may include its unit operating cost, unit penalty cost for solar power curtailment, solar power curtailment at each scheduling period, actual output power at each scheduling period, and predicted output power at each scheduling period. The above unit operating cost may be the cost per unit of electric power produced by the PV, whose unit may be "$/kW". The above unit penalty cost for solar power curtailment may be the pre-set penalty cost of abandoning unit solar power generation. The predicted output power may be pre-set based on weather conditions. The above solar power curtailment may be the abandoned power generation of the PV. The energy device name of CHPs may be "combined heat and power unit". The above CHPs may be the CHPs equipped with CCSs. The energy device parameters of the CHP may include its unit start-up cost, unit shut-down cost, unit operating cost, electric-to-heat ratio, natural gas-to-electric ratio, natural gas-to-heat ratio, ramp-down rate, ramp-up rate, minimum natural gas consumption rate, maximum natural gas consumption rate, unit carbon emission intensity, natural gas consumption rate at each scheduling period, start-up indicator variable at each scheduling period, shut-down indicator variable at each scheduling period, operating status at each scheduling period, electric output power at each scheduling period, and thermal output power at each scheduling period. The above unit start-up cost may be the cost of starting up the CHP once. The above unit shut-down cost may be the cost of shutting up the CHP once. The energy device parameters of the CCS may include its unit operating cost, $CO_2$ capture rate at each scheduling period, and $CO_2$ capture efficiency. The energy device name of P2Gs may be "power-to-gas device". The P2G may include the power-to-hydrogen (P2H) device and the hydrogen-to-natural gas (H2N) device. The energy device parameters of the P2G may include its unit operating cost, consumed electric power at each scheduling period, and the parameters of the P2H and the H2N. The energy device parameters of the P2H may include its conversion coefficient, ramp-down rate, ramp-up rate, maximum consumed electric power, consumed electric power at each scheduling period, and hydrogen production at each scheduling period. The energy device parameters of the H2N may include its conversion coefficient, maximum natural gas production rate, ramp-down rate, ramp-up rate, natural gas production rate at each scheduling period, hydrogen consumption rate at each scheduling period, and $CO_2$ consumption rate at each scheduling period. The energy device name of ESs may be "energy storage device". The ES may include the electric storage (BT), thermal storage (TS), natural gas storage (GS), and hydrogen storage (HS). The energy device parameters of the ES may include its unit operating cost, minimum input power, maximum input power, minimum output power, maximum output power, minimum remaining energy state, energy loss rate, charging efficiency, discharging efficiency, input power at each scheduling period, output power at each scheduling period, and remaining energy state at each scheduling period. It should be noted that wireless connection methods may include but are not limited to 3G/4G connection, WiFi connection, Bluetooth connection, WiMAX connection, Zigbee connection, UWB (ultra wideband) connection, and other known or future-developed wireless connection methods.

S102: generating the energy acquisition cost information for each energy device based on the energy device name, energy device parameter information and energy device number in the energy device information set.

In some embodiments, based on the energy device names, energy device parameter information and energy device numbers in the energy device information set, the IES operator may generate the energy acquisition cost information for each energy device in the IES. In practice, the IES operator may generate the energy acquisition cost information for each energy device in the IES through the following steps:

Step 1: the energy acquisition cost information of PVs may be obtained by the following formula:

$$F_{PV} = \sum_{t \in \Omega} \sum_{i \in E_{PV}} \omega_{PV}^{cur} P_{PV,i,t}^{cur} \Delta t + \sum_{t \in \Omega} \sum_{i \in E_{PV}} \omega_{PV,i,t} P_{PV,i,t} \Delta t \quad (1)$$

where in (1), $F_{PV}$ is the total operating cost of PVs, $\omega_{PV}^{cur}$ is unit penalty cost for solar power curtailment of PVs, $P_{PV,i,t}^{cur}$ is the solar power curtailment of the i-th PV at the t-th scheduling period, $\Omega$ is the set of the scheduling periods, $E_{PV}$ is the set of PVs, and $\Delta t$ is the time interval. The above time interval may be 15 minutes or 1 hour. $\omega_{PV,i,t}$ is the unit operating cost of the i-th PV, and $P_{PV,i,t}$ is the actual output power of the i-th PV at the t-th scheduling period.

Step 2: the energy acquisition cost information of CHPs may be obtained by the following formulas:

$$F_{CHP}^{u-d} = \sum_{t\in\Omega}\sum_{i\in E_{CHP}} (\omega_{CHP,i}^{on} u_{i,t}^{on} + \omega_{CHP,i}^{off} u_{i,t}^{off})\Delta t \tag{2}$$

$$F_{CHP} = \sum_{t\in\Omega}\sum_{i\in E_{CHP}} (\omega_{CHP,i}^{on} u_{i,t}^{on} + \omega_{CHP,i}^{off} u_{i,t}^{off})\Delta t \tag{3}$$

where in (2), $F_{CHP}^{u-d}$ is the total start-up and shutdown costs of CHPs, $E_{CHP}$ is the set of CHPs, $\omega_{CHP,i}^{on}$ is the unit start-up cost of the i-th CHP, $\omega_{CHP,i}^{off}$ is the unit shut-down cost of the i-th CHP, $u_{i,t}^{on}$ is the start-up indicator variable of the i-th CHP at the t-th scheduling period, $u_{i,t}^{off}$ is the shut-down indicator variable of the i-th CHP at the t-th scheduling period. In (3), $F_{CHP}$ is the total operating cost of CHPs, $\omega_{CHP,i,t}$ is the unit operating cost of the i-th CHP, and $N_{CHP,i,t}$ is the natural gas consumption rate of the i-th CHP at the t-th scheduling period.

Step 3: the energy acquisition cost information of CCSs may be obtained by the following formula:

$$F_{CCS} = \sum_{t\in\Omega}\sum_{i\in E_{CCS}} \omega_{CCS,i} C_{CCS,i,t}\Delta t \tag{4}$$

where in (4), $F_{CCS}$ is the total operating cost of CCSs, $E_{CCS}$ is the set of CCSs, $\omega_{CCS,i}$ is the unit operating cost of the i-th CCS, and $C_{CCS,i,t}$ is the $CO_2$ capture rate of the i-th CCS at the t-th scheduling period.

Step 4: the energy acquisition cost information of P2Gs may be obtained by the following formula:

$$F_{P2G} = \sum_{t\in\Omega}\sum_{i\in E_{P2G}} \omega_{P2G,i} C_{P2G,i,t}\Delta t \tag{5}$$

where in (5), $F_{P2G}$ is the total operating cost of P2Gs, $E_{P2G}$ is the set of P2Gs, $\omega_{P2G,i}$ is the unit operating cost of the i-th P2G, and $P_{P2G,i,t}$ is the consumed electric power of the i-th P2G at the t-th scheduling period.

Step 5: the operating cost information of ESs may be obtained by the following formula:

$$F_{ES} = \sum_{t\in\Omega}\sum_{r\in\Theta}\sum_{i\in E_r} \omega_{r,i}(Q_{r,i,t}^c + Q_{r,i,t}^d)\Delta t \tag{6}$$

where in (6), $F_{ES}$ is the total operating cost of ESs, and $\Theta$ is the set of ES types. The above set of ES types may include electric energy storage, thermal energy storage, natural gas storage, and hydrogen storage. $E_r$ is the set of the r-th type ESs, $\omega_{r,i}$ is the unit operating cost of the r-th type i-th ES, $Q_{r,i,t}^c$ is the input power of the r-th type i-th ES at the t-th scheduling period, and $Q_{r,i,t}^d$ is the output power of the r-th type i-th ES at the t-th scheduling period.

Step 6: based on the energy acquisition cost information of each energy device mentioned above, the total operating cost of the IES may be generated by the following formula:

$$F_{dev} = F_{PV} + F_{CHP} + F_{CCS} + F_{P2G} + F_{ES} \tag{7}$$

where in (7), $F_{dev}$ is the total operating cost of the energy devices in the IES.

S103: Generating the IES energy scheduling objective values and objective energy device parameter information based on the preset constraint sets and energy acquisition cost information of each energy device.

In some embodiments, the IES operator may generate the IES energy scheduling objective values and objective energy device parameter information based on the preset constraint sets and energy acquisition cost information of each energy device. The above IES energy scheduling objective values may be the minimum total operating cost of the IES. The above objective energy device parameter information may include the objective energy device parameter information of each PV, CHP, CCS, P2G, BT, TS, GS, HS, energy purchases from the energy grid, or adjustable load. The objective energy device parameter information of each PV may include its solar power curtailment and actual output power at each scheduling period. The objective energy device parameter information of each CHP may include its natural gas consumption rate, start-up indicator variable, shut-down indicator variable, operating status, electric output power, and thermal output power at each scheduling period. The objective energy device parameter information of each CCS may include its $CO_2$ capture rate at each scheduling period. The objective energy device parameter information of each P2G may include its consumed electric power at each scheduling period and the objective energy device parameter information of the P2H and H2N. The objective energy device parameter information of each P2H may include its consumed electric power and hydrogen production rate at each scheduling period. The objective energy device parameter information of each H2N may include its natural gas production rate, hydrogen consumption rate, and $CO_2$ consumption rate at each scheduling period. The objective energy device parameter information of each BT, TS, GS, or HS may include its input power, output power, and remaining energy state at each scheduling period. The objective energy device parameter information of the energy purchases from the energy grid may include the purchased electric power, purchased thermal power, and purchased natural gas from the energy grids at each scheduling period. The objective energy device parameter information of the adjustable load may include the transferable and interruptible load. The above energy grids may include the electric grid, thermal grid, and natural gas grid. The above load may include the electric load, thermal load, and hydrogen load. The above constraint set may include the operating constraints of each PV, P2G, CHP, ES, integrated demand response, and energy balance constraints. The operating constraints of each PV may be expressed by the following formulas:

$$0 \leq P_{PV,i,t} \leq P_{PV,i,t}^{max}, \forall i \in E_{PV}, t \in \Omega \tag{8}$$

$$P_{PV,i,t}^{cur} = P_{PV,i,t}^{max} - P_{PV,i,t}, \forall i \in E_{PV}, t \in \Omega \tag{9}$$

where in (8), $P_{PV,i,t}$ is the actual output power of the i-th PV at the t-th scheduling period, and $P_{PV,i,t}^{max}$ is the predicted output power of the i-th PV at the t-th scheduling period.

The operating constraints of each P2G may be expressed by the following formulas:

$$H_{P2H,i,t} = \eta_{P2H} P_{P2H,i,t}, \forall i \in E_{P2G}, t \in \Omega \quad (10)$$

$$\Delta P_{P2H,i}^{min} \leq P_{P2H,i,t} - P_{P2H,i,t-1} \leq \Delta P_{P2H,i}^{max}, \forall i \in E_{P2G}, t \in \Omega \quad (11)$$

$$0 \leq P_{P2H,i,t} \leq P_{P2H,i}^{max}, \forall i \in E_{P2G}, t \in \Omega \quad (12)$$

$$N_{H2N,i,t} = \eta_{H2N} H_{H2N,i,t}, \forall i \in E_{P2G}, t \in \Omega \quad (13)$$

$$C_{H2N,i,t} = \gamma H_{H2N,i,t}, \forall i \in E_{P2G}, t \in \Omega \quad (14)$$

$$0 \leq N_{H2N,i,t} \leq N_{H2N,i}^{max}, \forall i \in E_{P2G}, t \in \Omega \quad (15)$$

$$\Delta N_{H2N,i}^{min} \leq N_{H2N,i,t} - N_{H2N,i,t-1} \leq \Delta N_{H2N,i}^{max}, \forall i \in E_{P2G}, t \in \Omega \quad (16)$$

where in (10), $H_{P2H,i,t}$ is the hydrogen production rate of the power-to-hydrogen (P2H) device in the i-th P2G at the t-th scheduling period, and $\eta_{P2H}$ is the conversion coefficient of the P2H device in the i-th P2G. Equation (10) represents the relationship between hydrogen production and electric power consumption. In (11), $P_{P2H,i,t}$ is the consumed electric power of the P2H device in the i-th P2G at the t-th scheduling period, $\Delta P_{P2H,i}^{min}$ is the ramp down rate of the P2H device in the i-th P2G, and $\Delta P_{P2H,i}^{max}$ is the ramp up rate of the P2H device in the i-th P2G. In (12), $P_{P2H,i}^{max}$ is the maximum consumed electric power of the P2H device in the i-th P2G. Constraints (11) and (12) limit the electric power consumption and its variation of the P2H device in the i-th P2G. In (13), $N_{H2N,i,t}$ is the natural gas production rate of the hydrogen-to-natural gas (H2N) device in the i-th P2G at the t-th scheduling period, $H_{H2N,i,t}$ is the hydrogen consumption rate of the hydrogen-to-natural gas (H2N) device in the i-th P2G at the t-th scheduling period, and $\eta_{H2N}$ is the conversion coefficient of the H2N device in the P2G. Constraint (13) represents the relationship between the natural gas production rate and hydrogen consumption rate of the H2N device in the i-th P2G. In (14), $C_{H2N,i,t}$ is the $CO_2$ consumption rate of the H2N device in the i-th P2G and $\gamma$ is the proportion of hydrogen and $CO_2$ in methanation. Constraint (14) represents the relationship between the $CO_2$ consumption rate and hydrogen consumption rate in the H2N device. In (15), $N_{H2N,i}^{max}$ is the maximum natural gas production rate of the H2N device in the i-th P2G. In (16), $\Delta N_{H2N,i}^{min}$ is the ramp-down rate of the H2N device in the i-th P2G and $\Delta N_{H2N,i}^{max}$ is the ramp-up rate of the H2N device in the i-th P2G. Constraints (15) and (16) limit the natural gas production rate and its variation of the H2N device in the i-th P2G.

The operating constraints of each CHP may be expressed by the following formulas:

$$P_{CHP,i,t} = \eta_{CHP}^{E-T} T_{CHP,i,t}, \forall i \in E_{CHP}, t \in \Omega \quad (17)$$

$$N_{CHP,i,t} = \eta_{CHP}^{N-E} P_{CHP,i,t} + \eta_{CHP}^{N-T} T_{CHP,i,t}, \forall i \in E_{CHP}, t \in \Omega \quad (18)$$

$$\Delta N_{CHP,i}^{min} \leq N_{CHP,i,t} - N_{CHP,i,t-1} \leq \Delta N_{CHP,i}^{max}, \forall i \in E_{CHP}, t \in \Omega \quad (19)$$

$$z_{i,t} N_{CHP,i}^{min} \leq N_{CHP,i,t} \leq z_{i,t} N_{CHP,i}^{max}, \forall i \in E_{CHP}, t \in \Omega \quad (20)$$

$$u_{i,t}^{on} - u_{i,t}^{off} = z_{i,t+1} - z_{i,t}, \forall i \in E_{CHP}, t \in \Omega \quad (21)$$

$$u_{i,t}^{on} + u_{i,t}^{off} \leq 1, \forall i \in E_{CHP}, t \in \Omega \quad (22)$$

$$C_{CCS,i,t} = \eta_{CCS} e_C P_{CHP,i,t}, \forall i \in E_{CHP}, t \in \Omega \quad (23)$$

where in (17), $\eta_{CHP}^{E-T}$ is the electric-to-heat ratio of the CHP. Constraint (17) represents the relationship between the electric output power and thermal output power of the i-th CHP. In (18), $\eta_{CHP}^{N-E}$ is the natural gas-to-electric ratio of the CHP and $\eta_{CHP}^{N-T}$ is the natural gas-to-heat ratio of the CHP. Constraint (18) represents the relationship between natural gas consumption, electric power, and thermal power. In (19), $\Delta N_{CHP,i}^{min}$ is the ramp-down rate of the i-th CHP and $\Delta N_{CHP,i}^{max}$ is the ramp-up rate of the i-th CHP. In (20), $N_{CHP,i}^{min}$ is the minimum natural gas consumption rate of the i-th CHP, $N_{CHP,i}^{max}$ is the maximum natural gas consumption rate of the i-th CHP, and $z_{i,t}$ is the operating status of the i-th CHP at the t-th scheduling period. Constraints (19) and (20) represent the upper and lower bounds of the natural gas consumption rate of the CHP and its rate of change. Constraint (21) represents the relationship between the start-up status, shut-down status and the sign of start-up and shutdown of the i-th CHP. Constraint (22) ensures that CHP cannot start and shut down at the same time. In (23), $C_{CCS,i,t}$ is the $CO_2$ capture rate of the i-th CCS at the t-th scheduling period, $\eta_{CCS}$ is the $CO_2$ capture efficiency of the CCS, and $e_C$ is the unit carbon emission intensity of the CHP.

The operating constraints of each ES may be expressed by the following formulas:

$$Q_{r,i}^{c,min} \leq Q_{r,i,t}^c \leq Q_{r,i}^{c,max}, \forall r \in \Theta, i \in E_r, t \in \Omega \quad (24)$$

$$Q_{r,i}^{d,min} \leq Q_{r,i,t}^d \leq Q_{r,i}^{d,max}, \forall r \in \Theta, i \in E_r, t \in \Omega \quad (25)$$

$$S_{r,i}^{min} \leq S_{r,i,t} \leq S_{r,i}^{max}, \forall r \in \Theta, i \in E_r, t \in \Omega \quad (26)$$

$$S_{r,i,t} = (1 - \lambda_{r,i}) S_{r,i,t-1} + \left( Q_{r,i,t}^c \eta_{r,i}^c - \frac{Q_{r,i,t}^d}{\eta_{r,i}^d} \lambda_{r,i} \right) \Delta t, \quad (27)$$

$$\forall r \in \Theta, i \in E_r, t \in \Omega$$

where in (24), $Q_{r,i}^{c,min}$ in is the minimum input power of the r-th type ES i and $Q_{r,i}^{c,max}$ is the maximum input power of the r-th type ES i. In (25), $Q_{r,i}^{d,min}$ is the minimum output power of the r-th type ES i and $Q_{r,i}^{d,max}$ is the maximum output power of the r-th type ES i. Constraints (24) and (25) specify the range of input and output power of the ES. In (26), $S_{r,i}^{min}$ is the minimum remaining energy state of the r-th type ES i, $S_{r,i}^{max}$ is the maximum remaining energy state of the r-th type ES i, and $S_{r,i,t}$ is the remaining energy state of the r-th type ES i at the t-th scheduling period. In (27), $\lambda_{r,i}$ is the energy loss rate of the r-th type ES i, $\eta_{r,i}^c$ is the charging efficiency of the r-th type ES i, and $\eta_{r,i}^d$ is the discharging efficiency of the r-th type ES i.

The constraints for integrated demand response may be expressed by the following formulas:

$$\Sigma_{t \in \Omega} D_{shift+,v,t} = \Sigma_{t \in \Omega} D_{shift-,v,t}, \forall v \in M \quad (28)$$

$$D_{shift+,v}^{min} \leq D_{shift+,v,t} \leq D_{shift+,v}^{max}, \forall v \in M, t \in \Omega \quad (29)$$

$$D_{shift-,v}^{min} \leq D_{shift-,v,t} \leq D_{shift-,v}^{max}, \forall v \in M, t \in \Omega \quad (30)$$

$$D_{cut,v}^{min} \leq D_{cut,v,t} \leq D_{cut,v}^{max}, \forall v \in M, t \in \Omega \quad (31)$$

$$D_{load,v,t} = D_{load0,v,t} + D_{shift+,v,t} - D_{shift-,v,t} - D_{cut,v,t}, \forall v \in M, t \in \Omega \quad (32)$$

where in (28), M is the set of load types, $D_{shift+,v,t}$ is the load transfer-in of the v-th type load at the t-th scheduling period load and $D_{shift-,v,t}$ is the load transfer-out of the v-th type load at the t-th scheduling period load. In (29), $D_{shift+,v}^{min}$ is the minimum load transfer-in of the v-th type load and $D_{shift+,v}^{max}$ is the maximum load transfer-in of the v-th type load. In (30), $D_{shift-,v}^{min}$ is the minimum load transfer-out of the v-th type load and $D_{shift-,v}^{max}$ is the maximum load transfer-out of the v-th type load. In (31), $D_{cut,v,t}$ is the interruptible load of the v-th type load at the t-th scheduling period load, $D_{cut,v}^{min}$ is the minimum interruptible load of the v-th type load, and $D_{cut,v}^{max}$ is the maximum interruptible load of the v-th type load. In (32), $D_{load,v,t}$ is the value of the v-th type load at the t-th scheduling period load after integrated demand response and $D_{load0,v}$ is the preset basic load of the v-th type load.

The energy balance constraints may be expressed by the following formulas:

$$P_{load,t} = \tag{33}$$
$$P_{pur,t} + \sum_{i \in E_{PV}} P_{PV,i,t} + \sum_{i \in E_{CHP}} P_{CHP,i,t} + \sum_{i \in E_{BT}} Q_{BT,i,t} - \sum_{i \in E_{P2G}} P_{P2H,i,t},$$
$$\forall t \in \Omega$$

$$T_{load,t} = T_{pur,t} + \sum_{i \in E_{CHP}} \overline{T_{CHP,i,t}} + \sum_{i \in E_{TS}} \overline{Q_{TS,i,t}}, \forall t \in \Omega \tag{34}$$

$$N_{load,t} = N_{pur,t} + \sum_{i \in E_{P2G}} N_{N2H,i,t} - \sum_{i \in E_{CHP}} N_{CHP,i,t} + \sum_{i \in E_{GS}} Q_{GS,i,t}, \tag{35}$$
$$\forall t \in \Omega$$

$$H_{load,t} = \sum_{i \in E_{P2G}} (H_{P2G,i,t} - H_{H2N,i,t}) - \sum_{i \in E_{HS}} Q_{HS,i,t}, \forall t \in \Omega \tag{36}$$

$$\sum_{i \in E_{P2G}} C_{H2N,i,t} = \sum_{i \in E_{CCS}} C_{CCS,i,t}, \forall t \in \Omega \tag{37}$$

where in (33), $P_{load,t}$ is the total electric load in the IES at the t-th scheduling period, $P_{pur,t}$ is the purchased electric power from electric grid at the t-th scheduling period, $E_{BT}$ is the set of electric storage (BT), and $Q_{BT,i,t}$ is the output electric power of the i-th BT at the t-th scheduling period. In (34), $T_{load,t}$ is the total thermal load in the IES at the t-th scheduling period, $T_{pur,t}$ is the purchased thermal power from heat grid at the t-th scheduling period, $E_{TS}$ is the set of thermal storage (TS), and $Q_{TS,i,t}$ is the output thermal power of the i-th TS at the t-th scheduling period. In (35), $N_{load,t}$ is the total natural gas load in the IES at the t-th scheduling period, $N_{pur,t}$ is the purchased natural gas from natural gas grid at the t-th scheduling period, $E_{GS}$ is the set of gas storage (GS), and $Q_{GS,i,t}$ is the natural gas generation rate of the i-th GS at the t-th scheduling period. In (36), $H_{load,t}$ is the total hydrogen load in the IES at the t-th scheduling period, $E_{HS}$ is the set of hydrogen storage (HS), and $Q_{HS,i,t}$ is the hydrogen generation rate of the i-th HS at the t-th scheduling period.

In practice, based on the above operating constraints and the acquisition cost information of the energy devices, the IES operator may obtain the following objective function for the low-carbon IES scheduling:

$$\min F = F_{CHP}^{u-d} + F_{dev} + F_{pur} + F_{idr} \tag{38}$$

where in (38), F is the objective function of the low-carbon IES scheduling model and $F_{pur}$ is the total energy purchase cost. $F_{pur}$ may be obtained by the following formula:

$$F_{pur} = \sum_{t \in \Omega} (\omega_{pur}^E P_{pur,t} + \omega_{pur}^T T_{pur,t} + \omega_{pur}^G N_{pur,t}) \tag{39}$$

where in (39), $\omega_{pur}^E$ is the electricity price, $\omega_{pur}^T$ is the thermal price, and $\omega_{pur}^G$ is the natural gas price.

In (38), $F_{idr}$ is the subsidy cost for integrated demand response that the IES needs to pay. $F_{idr}$ may be obtained by the following formula:

$$F_{idr} = \sum_{v \in M} \left( \omega_{D,shift,v} \sum_{t \in \Omega} D_{shift+,v,t} + \omega_{D,cut,v} \sum_{t \in \Omega} D_{cut,v,t} \right) \tag{40}$$

where in (40), $\omega_{D,shift,v}$ is the subsidy cost for the v-th type transferable load and $\omega_{D,cut,v}$ is the subsidy cost for the v-th type interruptible load.

Optionally, before S103, the IES operator may perform the following steps:

Step 1: determining the preset scheduling period set of the first historical PV power scenarios in the first historical PV power scenario set as the objective scheduling period set, where the first historical PV power in any of the first historical PV power scenarios corresponds to the preset scheduling period in the preset scheduling period set, and the number of first historical PV power scenarios in the first historical PV power scenario set is the a first numerical value.

Step 2: performing the following sub-steps for each of the objective scheduling periods in the objective scheduling period set:

Sub-step 1: fitting the first historical PV power at each scheduling period in the first historical PV power scenario set to obtain the distribution function of the first historical PV power at each scheduling period. In practice, the IES operator may use the least square method to fit the first historical PV power at each scheduling period in the first historical PV power scenario set and obtain the distribution function of the first historical PV power at each scheduling period.

Sub-step 2: sampling the distribution function of the first historical PV power to obtain the second PV power set and first historical PV power number set. The second PV power in the above second PV power set corresponds one-to-one to the first historical PV power number in the above first historical PV power number set. Each first historical PV power number in the first historical PV power number set corresponds to a second PV power sampling interval. The above first historical PV power number corresponds to the number of each first historical PV power within the second historical PV power sampling interval mentioned above. In practice, first of all, the IES operator may equidistant sample preset numerical points on the curve of the distribution function of first historical PV power in ascending order. Then, the vertical coordinates of the adjacent sampling points in the preset numerical values may be combined into a second PV power sampling interval to obtain the second PV power sampling interval set. Further, for each second PV power sampling interval in the second PV power sampling interval set, the mean of the first historical PV power in the second PV power sampling interval may be determined as the second PV power, thus generating a second photovoltaic power set. Finally, for each second PV power sampling interval in the second PV power sampling interval set, the number of first historical PV power in the second PV power sampling interval may be determined as the first historical PV power number, thus generating the first historical PV power number set.

Step 3: determining the obtained second PV power sets at all scheduling periods as the second PV power scenario set.

Step 4: generating second PV power scenario probability values in the second PV power scenario set, based on the first historical PV power scenario number set and first numerical value mentioned above.

In some alternative implementations of some embodiments, the IES operator may generate the IES energy scheduling objective values and objective energy device parameter information based on the preset constraint sets and energy acquisitioncost information of each energy device through the following steps:

Step 1: determining the energy acquisition cost information of each energy device as the input parameter set of the objective function for IES scheduling.

Step 2: generating the objective function of IES scheduling based on the above input parameter set. In practice, the objective function of IES scheduling may be represented by the following formula:

$$minF = minF_{CHP}^{u-d} + \max_{\{p_s\}\in\Psi}\sum_{s\in\Phi} p_s \min(F_{dev} + F_{pur} + F_{idr}) \quad (41)$$

where in (41), $p_s$ is the actual probability value of the s-th second PV power scenario, $\Psi$ is the feasible region of the probability value of second PV power scenario, and $\Phi$ is the set of second PV power scenarios.

Step 3: determining the first constraint set, second constraint set, and third constraint set based on the above constraint sets. In practice, the IES operator may include the startup and shutdown constraints of CHPs in the first constraint set. The above first constraint set may include constraints (21) and (22). Then, the natural gas consumption constraints of CHPs may be included in the third constraint set. The above third constraint set may include constraint (20). Finally, the operating constraints except for the constraints in the first and third constraint sets, are included in the second constraint set. The above second constraint set may include constraints (8)-(19) and (23)-(37).

Step 4: determining the fourth constraint set based on the probability values of second PV power scenarios. The above fourth constraint set includes the norm-1 based constraints and norm-inf based constraints. In practice, the above norm-1 based constraints may be represented by the following formula:

$$\sum_{s\in\Phi}|p_s - p_s^0| \leq \rho_1 \quad (42)$$

where in (42), $p_s^0$ is the preset probability value of the s-th second PV power scenario and $\rho_1$ is a preset parameter.

The above norm-inf based constraints may be represented by the following formula:

$$\max_{s\in\Phi}|p_s - p_s^0| \leq \rho_\infty \quad (43)$$

where in (43), $\rho_\infty$ is a preset parameter.

Finally, the norm-1 based constraints and norm-inf based constraints constitute the fourth constraint set.

Step 5: linearizing the constraints in the above fourth constraint set to generate linear constraints and obtain a linear constraint set. The above linear constraint set includes the norm-1 based linear constraints and norm-inf based linear constraints. In practice, the norm-1 based constraints in the fourth constraint set may be equivalently transformed into the norm-1 based linear constraints in the linear constraint set by introducing the first auxiliary variable.

$$\sum_{s\in\Phi}\delta_s \leq \rho_1, \delta_s \geq p_s - p_s^0, \delta_s \geq p_s^0 - p_s, \forall\, s \in \Phi \quad (44)$$

where $\delta_s$ is the preset first auxiliary variable.

Then, the norm-inf based constraints in the fourth constraint set may be equivalently transformed into the norm-inf based linear constraints in the linear constraint set by introducing the second auxiliary variable.

$$\sigma_s \leq \rho_\infty,\ \sigma_s \geq p_s - p_s^0,\ \sigma_s \geq p_s^0 - p_s,\ \forall s \in \Phi \quad (44)$$

where $\sigma_s$ is the preset second auxiliary variable.

Step 6: generating the IES energy scheduling objective values and energy device scheduling instruction messages based on the above first constraint set, second constraint set, third constraint set, linear constraint set, and objective function of IES scheduling. In practice, the IES operator may use the column-and-constraint generation algorithm to solve the optimization model containing the above first constraint set, second constraint set, third constraint set, linear constraint set, and objective function of IES scheduling, thus obtaining the IES energy scheduling objective values and objective energy device parameter information.

S104: controlling the energy devices in the IES to execute energy scheduling tasks based on the objective energy device parameter information.

In some embodiments, various methods may be used to control the energy devices in the IES to execute the energy scheduling tasks based on the objective energy device parameter information. In practice, the IES operator may control each PV in various ways to ensure that its operating parameters at each scheduling period are equal to its objective energy device parameter information. The IES operator may control each CHP in various ways to ensure that its operating parameters at each scheduling period are equal to the same as objective energy device parameter information. The IES operator may control each P2G in various ways to ensure that its operating parameters at each scheduling period are equal to the same as objective energy device parameter information. The IES operator may control each BT in various ways to ensure that its operating parameters at each scheduling period are equal to the same as objective energy device parameter information. The IES operator may control each TS in various ways to ensure that its operating parameters at each scheduling period are equal to the same as objective energy device parameter information. The IES operator may control each GS in various ways to ensure that its operating parameters at each scheduling period are equal to the same as objective energy device parameter information. The IES operator may control each HS in various ways to ensure that its operating parameters at each scheduling period are equal to the same as objective energy device parameter information.

In some alternative implementations of certain embodiments, the IES operator may control the energy devices in the IES to execute energy scheduling tasks based on the objective energy device parameter information through the following steps:

Step 1: generating the energy device control information of each energy device in the virtual power plant and obtaining the energy device control information set, when the current period meets the preset scheduling period conditions. The above energy device control information may indicate that the energy device has started executing energy scheduling tasks. In practice, the IES operator may combine the energy device identification and the messages that characterize the start of energy scheduling tasks, thus generating the control messages of the energy devices. The above combination method may be character concatenation.

Step 2: controlling each energy device in the virtual power plant to execute the energy scheduling tasks based on the objective energy device parameter information, according to the above energy device control information set. In practice, the following sub-steps are performed:

Sub-step 1: determining the objective energy device parameter information corresponding to the energy device control information as the objective energy device parameter information. Thus, the objective energy device parameter information set is obtained.

Sub-step 2: according to the energy device control information, the energy device is controlled to execute the energy scheduling task according to the objective energy device parameter information set.

Optionally, the IES operator may perform the following steps:

Step 1: receiving an energy scheduling task triggering message sent by each energy device. Each energy device corresponds one-to-one to the energy scheduling task triggering message mentioned above. The energy scheduling task triggering message mentioned above may represent the corresponding energy device starting to execute energy scheduling tasks.

Step 2: generating the energy scheduling start prompt message when the number of energy scheduling task triggering messages received equals the energy device number. The above energy scheduling start prompt message may represent the prompt that the energy device starts executing energy scheduling tasks. The above energy scheduling start prompt message may be a combination of energy device identification and preset string. The above combination method may be character concatenation. For example, the above energy scheduling start prompt message may be "The photovoltaic system begins to execute energy scheduling tasks".

Step 3: controlling the associated display device to display the above energy scheduling start prompt message. The above display device may be a display screen that is connected to the IES operator through communication.

Step 4: receiving the energy scheduling task completion message sent by each energy device.

Step 5: generating the energy scheduling completion prompt message when the number of received energy scheduling task completion messages equals to the number of energy devices.

Step 6: controlling the associated display device to display the above energy scheduling completion prompt message.

Optionally, the IES operator may perform the following steps:

Step 1: receiving the energy scheduling task triggering message sent by each energy device. Each energy device corresponds one-to-one to the energy scheduling task triggering message mentioned above. The energy scheduling task triggering message mentioned above may represent the corresponding energy device starting to execute energy scheduling tasks.

Step 2: generating the energy scheduling start sound prompt message when the number of energy scheduling task triggering messages received equals the energy device number. The above energy scheduling start sound prompt message may represent the prompt that the energy device starts executing energy scheduling tasks. The above energy scheduling start sound prompt message may be a combination of energy device identification and preset string. The above combination method may be character concatenation. For example, the above energy scheduling start sound prompt message may be "The photovoltaic system begins to execute energy scheduling tasks".

Step 3: controlling the associated sound device to play the above energy scheduling start sound prompt message, where the above sound device may be a sound player.

Step 4: receiving the energy scheduling task completion message sent by each energy device.

Step 5: generating the energy scheduling completion sound prompt message when the number of received energy scheduling task completion messages equals the number of energy devices.

Step 6: controlling the associated sound device to play the above energy scheduling completion sound prompt message.

Further, referring to FIG. 2, as an implementation of the above method, the present application provides some embodiments of the device for low-carbon virtual power plant scheduling, which correspond to the method embodiments shown in FIG. 1. The device may be specifically applied to various electronic devices.

As shown in FIG. 2, the embodiments of the device 200 for low-carbon virtual power plant scheduling include: acquisition unit 201, first generation unit 202, second generation unit 203, and control unit 204. The acquisition unit 201 is configured to obtain the energy device information set for each energy device in the virtual power plant, wherein the energy device information in the above energy device information set comprises energy device names, energy device parameter information and energy device numbers. The first generation unit 202 is configured to generate the acquisition cost information for each energy device based on the energy device name, energy device parameter information and energy device number in the energy device information set. The second generation unit 203 is configured to generate the energyscheduling objective values and the objective energy device parameter information of based on the preset constraint sets and energy acquisition cost information of each energy device. Control unit 204 is configured to control each energy device in the virtual power plant to execute the energy scheduling tasks based on the objective energy device parameter information.

It may be understood that the units recorded in device 200 correspond to the various steps in the method described with reference to FIG. 1. Therefore, the operations, features, and beneficial effects described above for the method are also applicable to the device 200 and the units contained therein, and will not be further elaborated here.

The flowchart and block diagram in the attached figure illustrates the possible architecture, functions, and operations of systems, methods, and computer program products according to various embodiments of the present application. At this point, each box in a flowchart or block diagram may represent a module, program segment, or part of code that contains one or more executable instructions for implementing specified logical functions. It should also be noted that in some alternative implementations, the functions indicated in the boxes may also occur in a different order than those indicated in the accompanying drawings. For example, two consecutive boxes may actually be executed in parallel, and sometimes they may also be executed in the opposite order, depending on the function involved. It should also be noted that each box in the block diagram and/or flowchart, as well as the combination of boxes in the block diagram and/or flowchart, may be implemented using dedicated hardware-based systems that perform specified functions or operations, or may be implemented using a combination of dedicated hardware and computer instructions.

The units described in some embodiments of the present application may be implemented through software or hardware. The described unit may also be set in the processor, for example, it may be described as: a processor comprising an acquisition unit, a first generation unit, a second generation unit, and a control unit. In some cases, the names of these units do not constitute a limitation of the unit itself. For example, the acquisition unit may also be described as "the unit that obtains the information set of the energy devices in the virtual power plant".

The functions described above in this article may be at least partially executed by one or more hardware logic components. For example, non-limiting examples of hardware logic components that may be used include: Field Programmable Gate Arrays (FPGAs), Application Specific Integrated Circuits (ASICs), Application Specific Standard Products (ASSPs), On Chip Systems (SOC), Complex Programmable Logic Devices (CPLDs), and so on.

The above description is only for some preferred embodiments of the present application and an explanation of the technical principles used. Those skilled in the art should understand that the scope of the invention referred to in the disclosed embodiments is not limited to technical solutions formed by specific combinations of the aforementioned technical features, but should also cover other technical solutions formed by any combination of the aforementioned technical features or equivalent features without departing from the aforementioned invention concept. For example, the technical solution formed by replacing the above features with (but not limited to) technical features with similar functions disclosed in the disclosed embodiments.

What is claimed is:

1. A method for controlling energy devices, comprising:
    obtaining an energy device information set corresponding to each of the energy devices in a virtual power plant, wherein each piece of energy device information comprised in the energy device information set comprises an energy device name, energy device parameter information and an energy device number;
    generating energy acquisition cost information corresponding to each piece of the energy device information for each piece of the energy device information comprised in the energy device information set according to the energy device name, the energy device parameter information and the energy device number comprised in each piece of the energy device information;
    determining a preset scheduling period set corresponding to any of first historical photovoltaic power scenarios in a first historical photovoltaic power scenario set as an objective scheduling period set, wherein first historical photovoltaic power in any of the first historical photovoltaic power scenarios corresponds to preset scheduling periods in the preset scheduling period set, and a number of the first historical photovoltaic power scenarios comprised in the first historical photovoltaic power scenario set is a first numerical value;
    performing following steps for each of objective scheduling periods in the objective scheduling period set:
    fitting the first historical photovoltaic power corresponding to each of the objective scheduling periods comprised in the first historical photovoltaic power scenario set to obtain a distribution function of the first historical photovoltaic power corresponding to each of the objective scheduling periods;
    sampling the distribution function of the first historical photovoltaic power to obtain a second historical photovoltaic power set and a first historical photovoltaic power number set corresponding to each of the objective scheduling periods, wherein second historical photovoltaic power in the second historical photovoltaic power set corresponds to first historical photovoltaic power numbers in the first historical photovoltaic power number set, and each of the first historical photovoltaic power numbers in the first historical photovoltaic power number set corresponds to a second historical photovoltaic power sampling interval, wherein each of the first historical photovoltaic power numbers is a number of the first historical photovoltaic power within the second historical photovoltaic power sampling interval among the first historical photovoltaic power;
    determining obtained second photovoltaic power sets as a second photovoltaic power scenario set;
    generating a second historical photovoltaic power scenario probability value corresponding to each of second historical photovoltaic power scenarios for each of the second historical photovoltaic power scenarios in the second historical photovoltaic power scenario set according to the first historical photovoltaic power number set corresponding to each of the second historical photovoltaic power scenarios and the first numerical value;
    generating energy scheduling objective values and objective energy device parameter information based on preset constraint sets and the generated energy acquisition cost information, wherein the constraint sets comprise constraints representing constraining at least one piece of the energy device parameter information comprised in the energy device information set; and
    controlling each of the energy devices in the virtual power plant to execute energy scheduling tasks according to each piece of the objective energy device parameter information.

2. The method according to claim 1, wherein controlling each of the energy devices in the virtual power plant to execute the energy scheduling tasks according to each piece of the objective energy device parameter information comprises:
    generating energy device control information of each of the energy devices corresponding to each of the energy devices and obtaining an energy device control information set, in response to determining that a current period meets preset energy scheduling period conditions; and controlling each of the energy devices to execute the energy scheduling tasks based on each piece of the objective energy device parameter information according to the energy device control information set.

3. The method according to claim 1, wherein the method further comprises:

receiving an energy scheduling task triggering message sent by each of the energy devices;

generating an energy scheduling start prompt message in response to determining that a number of received energy scheduling task triggering messages is equal to the energy device number;

controlling an associated display device to display the energy scheduling start prompt message;

receiving an energy scheduling task completion message sent by each of the energy devices;

generating an energy scheduling completion prompt message in response to determining that a number of received energy scheduling task completion messages is equal to the energy device number; and controlling the associated display device to display the energy scheduling completion prompt message.

4. The method according to claim 1, wherein the method further comprises:

receiving an energy scheduling task triggering message sent by each of the energy devices;

generating an energy scheduling start sound prompt message in response to determining that a number of received energy scheduling task triggering messages is equal to the energy device number;

controlling an associated sound device to play the energy scheduling start sound prompt message;

receiving an energy scheduling task completion message sent by each of the energy devices;

generating an energy scheduling completion sound prompt message in response to determining that a number of received energy scheduling task completion messages is equal to the energy device number; and controlling the associated sound device to play the energy scheduling completion sound prompt message.

* * * * *